Feb. 6, 1951     B. F. LAWRENCE ET AL     2,540,397
ICE-CREAM SCOOP
Filed Feb. 27, 1946
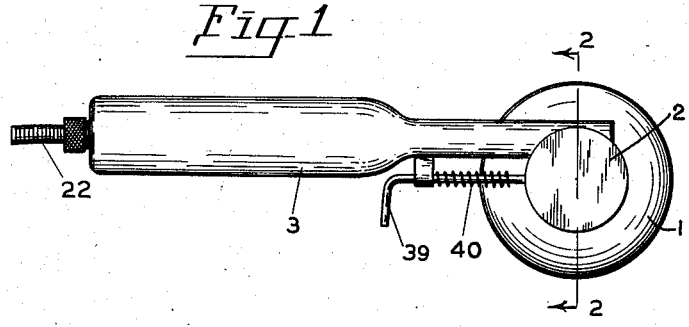
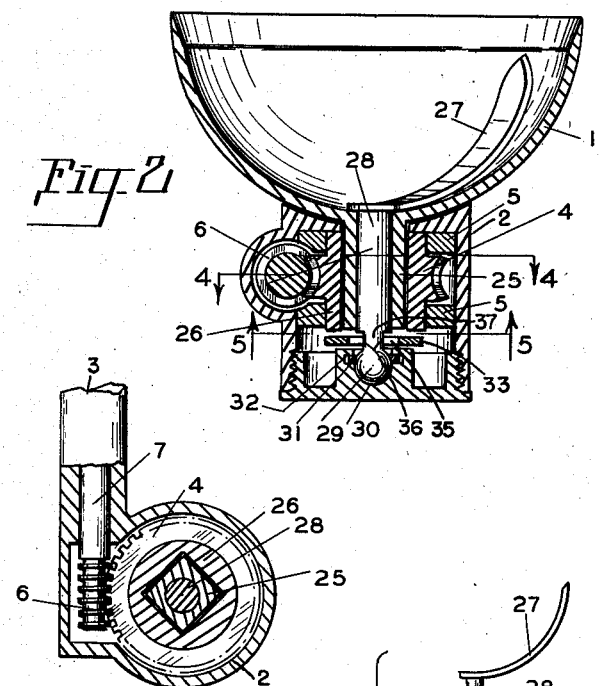
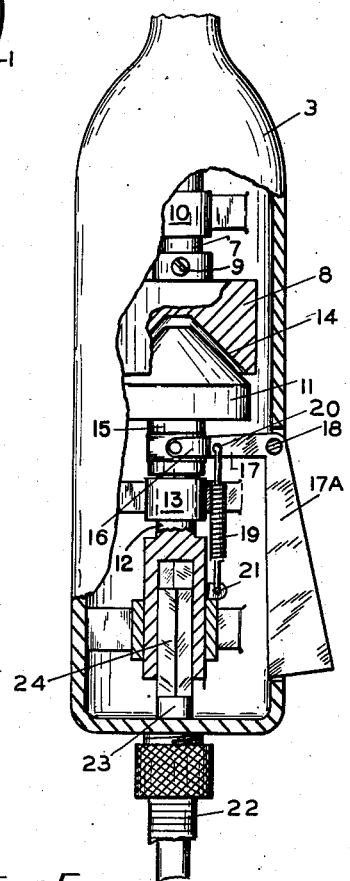
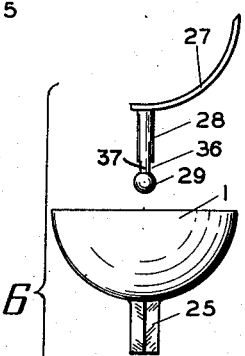
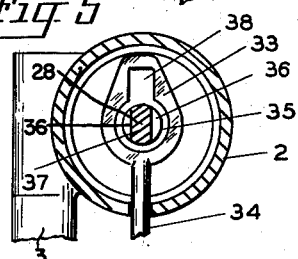
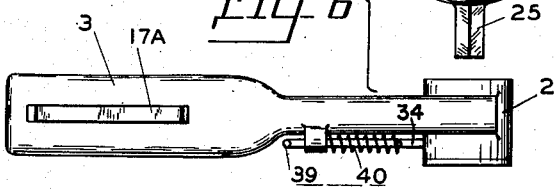
INVENTORS
BERT F. LAWRENCE
EMMA ETHEL LAWRENCE
ATTORNEY Patented Feb. 6, 1951

2,540,397

UNITED STATES PATENT OFFICE 2,540,397

ICE-CREAM SCOOP

Bert F. Lawrence and Emma Ethel Lawrence, Portland, Oreg.

Application February 27, 1946, Serial No. 650,554

4 Claims. (Cl. 107—48)

This invention relates to ice cream scoops and is particularly adapted for the dipping of hard frozen ice creams.

The primary object of the invention is to provide an ice cream scoop with a revolving bowl having a cutting edge formed therein for cutting its way into the ice cream that is in a frozen state within containers as for instance in the serving of ice cream in dishes or cones from the freezing cabinet.

A further object of the invention is the provision of a means for disassembling the working parts of the scoop for cleansing of the parts.

These and other incidental objects will be apparent in the drawings, specification and claims.

Referring to the drawings:

Figure 1 is a plan view of the scoop, looking at the rear of the bowl.

Figure 2 is an end sectional view taken on line 2—2 of Figure 1 looking in the direction indicated, the bowl being inverted from that shown in Figure 1.

Figure 3 is an enlarged view of the handle of the scoop, parts being broken away for convenience of illustration.

Figure 4 is a fragmentary sectional view taken on line 4—4 of Figure 2 looking in the direction indicated and illustrating driving gears associated with the bowl.

Figure 5 is a sectional view taken on line 5—5 of Figure 2 looking in the direction indicated, illustrating the scraper lock mechanism.

Figure 6 is a side view of the scoop illustrating how the bowl and the scraper are removed for cleansing.

In the drawings:

Our new and improved ice cream scoop consists of a bowl 1, driving gear, housing 2 and a handle 3. Journalled within the housing 2 is a worm gear 4 running in suitable greaseless bearings 5. These bearings maintain the worm gear 4 in a definite location and alignment within the housing 2. The worm gear 4 is driven by the worm 6, which is journalled within the housing 2 and driven by the shaft 7. The shaft 7 has a female clutch member 8 keyed thereto at 9. The shaft runs in suitable bearings 10 within the handle 3. A cone 11 is keyed to the shaft 12 mounted in the bearings 13 within the handle 3, the clutch 11 is a male member and engages the inner surface 14 of the female member 8 by the action of the thrust collar 15, which is operated by the yoke 16 forming part of the bell crank 17, which in turn is pivotally mounted at 18 to the handle 3.

The clutch is normally disengaged by the spring 19, which is fixedly secured to the yoke 16 at 20 and to the handle 3 at 21. This spring pulls the shaft 12 away from the clutch assembly disengaging the male member 11 from the female member of the clutch 8. A flexible cable 22 is connected to a source of rotating power not here shown. The drive shaft 23 of this cable drives the shaft 12 by way of the spline connection 24.

1 indicates a bowl rotatably mounted on the housing 2. Extending from the bottom of the bowl is a stem 25, square or irregular in shape in cross section and formed with a central bearing, the stem passing through a correspondingly-shaped opening formed in the worm gear 4. Thus, when the worm gear is rotated, the stem and bowl are likewise rotated.

A scraper 27 is mounted in the bowl and is provided with a spindle 28. The spindle 28 is mounted in the central bearing in the stem 25 and extends some distance beyond the free end of said stem.

A ball 29 is formed at the free end of the spindle, the ball being seated in a bearing 30 formed in the lower part of the housing 2. The ball is removably mounted in the bearing 30 by a resilient element in the form of a spring 31 engaging in an annular groove 32 formed in the spindle, whereby the spindle, scraper and bowl are retained in assembled relation. Obviously, since the element 31 is resilient, by pulling up on the scraper, the spindle can be disengaged from the bearing 30 and the parts separated, as will be hereinafter described.

Above the ball end 29, the spindle is formed with a flat portion 37 formed by opposite grooves 36, as shown in Figures 2, 5 and 6.

A locking key 33 having an extension 34 is slidably mounted in the housing to cooperate with the spindle 28. The key is formed with a bayonet slot, the enlarged portion 35 of which corresponds to the diameter of the spindle 28, while the narrow part 38 of said slot equals the width of a flat portion 37 of the spindle.

The outer end of the extension 34 is bent to form a handle 39, and a spring 40 on the extension serves to normally hold the key in position to register the enlarged portion 35 of the slot with the spindle.

When the key is in position to register the enlarged portion 35 of the slot with the spindle, as shown in Figures 2 and 5, by pulling up on the scraper, the ball end of the spindle can be disengaged from its bearing, and the scraper and bowl separated from the housing. When the position of the key is reversed to straddle the narrow part 38 of the slot with the flat portion 37 of the spindle, the spindle will be held against rotation within the bowl and at the same time the parts are effectively locked together in assembled form.

The flexible drive shaft or cable assembly 22 is driven at all times and when the lever 17A is depressed it will engage the male portion of the clutch 11 with the female body portion 8 revolving the shaft 7, worm 6, worm gear 4, the hollow stem 25 and the bowl 1, together with the scraper 27, although the scraper 27 may be held by the key 33 whenever desired. When the bowl is revolving the scoop is forced through the ice cream. When the scoop is full it can be removed therefrom by either falling out of the bowl of its own accord or by stopping the scraper 27 in its rotation by the key 33 as above described.

When the scoop has been used and it is desired to cleanse the same, the handle 3 and the housing 2 are grasped in one hand, the bowl 1 in the opposite hand, then by pulling the bowl 1 away from the housing 2 the ball 30 of the spindle 28 can be pulled past the retainer ring 31 which will allow the ball and the scraper assembly to be removed as illustrated in Figure 6.

What we claim as new is:

1. An ice cream scoop, including a housing having a bearing in its lower portion, a revolvable bowl mounted on the upper portion of the housing, said bowl having a hollow stem formed with a flat portion, a scraper mounted in the bowl, said scraper having a spindle revolvably mounted in the hollow stem, the lower free end of the spindle fitting in the bearing in the lower portion of the housing, said spindle having a reduced flat portion, resilient means in the bearing in the lower part of the housing cooperating with the lower end of the spindle for removably holding the spindle in said bearing and retaining the bowl and scraper in the housing, means mounted on the flat portion of the stem to rotate the bowl, means including a slidably mounted key having a slot, one end of said slot being equal to the diameter of the spindle and the opposite end of said slot being equal to the width of the reduced flat portion of the spindle, whereby when said key is moved to register the part of the slot equal to the diameter of the spindle the scraper is free to rotate with the bowl, or when the said key is moved to another position to present that portion of the slot which is equal to the reduced flat portion of the spindle and straddles same the scraper is locked against rotation when the bowl is rotated.

2. An ice cream spoon, including a housing formed in its lower portion with a bearing, a revolvable bowl mounted on the housing, a scraper mounted in the bowl, a worm gear in the housing, said worm gear having an angular-shaped opening, the bowl having an angular-shaped stem formed with a central bearing, said stem fitting in the angular-shaped opening in the worm gear, the scraper having a spindle operatively mounted in the central bearing in the stem and extending beyond the lower end of the stem, the lower end of the spindle being spherical in shape and supported in the bearing formed in the lower portion of the housing, a resilient element in the bearing in the housing cooperating with the lower spherical end of the spindle to removably secure said spindle in the bearing in the lower portion of the housing, the lower end portion of the spindle adjacent the spherical end having grooves to provide a reduced flattened portion, a slidable key having a key-hole slot, one end of said slot equalling the diameter of the spindle and its opposite end being equal to the width of the reduced flattened portion of said spindle, whereby when the key is moved in one position to align that portion of the slot which equals the diameter of the spindle with said spindle, the said spindle can be disengaged from the bearing in the housing and the scraper and bowl removed from the housing, or when said key is moved in the opposite direction and the reduced portion of the slot straddles the reduced flattened portion of said spindle, the scraper will be held stationary in the bowl when the latter is rotated, and power-controlled means for rotating the worm gear and the bowl.

3. An ice cream spoon, including a housing, a bowl rotatably mounted on the housing and provided with a stem having a central bearing and a flat side, a worm gear having an opening to receive the stem, the opening having a flat wall, the flat side of the stem engaging the flat wall of the opening for holding the stem non-rotatable in the opening in the worm gear, a scraper in the bowl, the scraper having a spindle mounted in the central bearing formed in the stem, the spindle extending below the lower free end of the stem, means between the lower extended end of the spindle and the housing for removably mounting the spindle in said housing, the spindle having a cut-away portion to provide a reduced flat portion, a manually operable key formed with a keyhole slot, the enlarged portion thereof being equal to the full diameter of the spindle and the narrow portion of said slot being equal to the width of the flat portion of the spindle, whereby when the key is moved to register the enlarged portion of the slot with the spindle, the spindle can be withdrawn from its mounting in the housing and the scraper and bowl removed from the housing, or when the key is moved in the opposite direction to straddle the narrow portion of the slot with the flat portion of the spindle, the scraper will be held stationary in the bowl when the latter is rotated, and controlled power-operating means for operating the worm gear.

4. An ice cream spoon, comprising a housing having a bearing, a worm gear mounted in the housing, the worm gear having a square opening, a bowl revolvably mounted on the housing, said bowl having a stem square in cross section and fitted in the square opening in the worm gear, said stem having a central bearing, a scraper operatively mounted in the bowl, a spindle extending from the scraper and operating in the central bearing in the stem and extending below the free end of the stem and mounted in the bearing in the housing, a resilient element mounted in the bearing in the housing to retain the bowl and scraper in the housing, said resilient element surrounding the end of the spindle to removably hold said spindle in said bearing, the spindle having a flat portion below the free end of the stem, a slidably mounted key in the housing, said key having an opening, one end of said opening equalling the diameter of the spindle and the opposite end of said opening equalling the width of the flat portion of the spindle, whereby when the key is moved to one position to register the part of the slot which equals the diameter of the spindle, the spindle can be disengaged from the bearing in the housing and the bowl and scraper separated from the housing, and when the key is moved in the opposite direction, the narrow part of the slot straddles the flat portion of the spindle and the scraper and bowl are locked in the housing, and controlled means for operating the worm gear.

BERT F. LAWRENCE.
EMMA ETHEL LAWRENCE.

REFERENCES CITED

The following references are of record in the file of this patent:

UNITED STATES PATENTS

| Number | Name | Date |
|---|---|---|
| 242,570 | Voorhees | June 7, 1881 |
| 1,574,788 | Brueseke | Mar. 2, 1926 |
| 1,763,389 | Chapman | June 10, 1930 |